US008854228B1

(12) United States Patent
Klissner et al.

(10) Patent No.: US 8,854,228 B1
(45) Date of Patent: Oct. 7, 2014

(54) SYSTEM AND METHOD FOR USING A SINGLE POINT INDICATOR AS A CPU UTILIZATION INDICATOR

(75) Inventors: Paul K. Klissner, Santa Clara, CA (US); Michael S. Bender, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1594 days.

(21) Appl. No.: 11/503,091

(22) Filed: Aug. 11, 2006

(51) Int. Cl.
*G08B 5/00* (2006.01)

(52) U.S. Cl.
USPC .......... 340/815.4; 340/691.1; 345/30; 345/39

(58) Field of Classification Search
USPC ............... 340/815.4, 815.43, 815.65, 815.66, 340/815.67, 691.1, 691.4, 691.6, 693.1
See application file for complete search history.

(56) References Cited

U.S. PATENT DOCUMENTS

| | | | | |
|---|---|---|---|---|
| 3,628,141 A * | 12/1971 | Union et al. | ................. | 324/72.5 |
| 4,734,619 A * | 3/1988 | Havel | ............................. | 313/510 |
| 5,214,762 A * | 5/1993 | Bush et al. | ....................... | 710/17 |
| 6,897,787 B2 * | 5/2005 | Colorado et al. | .......... | 340/815.4 |
| 7,012,542 B2 * | 3/2006 | Powell et al. | ............. | 340/815.44 |
| 7,372,371 B2 * | 5/2008 | Bear et al. | .................... | 340/815.4 |
| 2003/0164771 A1 * | 9/2003 | Dove et al. | .................... | 340/679 |
| 2004/0164873 A1 * | 8/2004 | Lee | ............................ | 340/815.4 |
| 2005/0040964 A1 * | 2/2005 | Thomas | ................... | 340/815.45 |

* cited by examiner

*Primary Examiner* — George Bugg
*Assistant Examiner* — Edny Labbees
(74) *Attorney, Agent, or Firm* — Marsh Fischmann & Breyfogle LLP; Kent A. Lembke

(57) ABSTRACT

A computer including a microprocessor, a memory system, a bus system, and a single point indicator. The memory system includes an operating system stored therein. The bus system couples the memory system to the microprocessor. The single point indicator is coupled to the microprocessor and is capable of emitting a single point of light of substantially any wavelength in a visible spectrum. The computer also includes logic that determines a level of a selected operational parameter of the computer and logic that generates a corresponding wavelength of light emitted from the single point indicator. The corresponding wavelength of light corresponds to the level of the selected operational parameter. A method for indicating a level of a selected operational parameter of a computer is also disclosed.

17 Claims, 6 Drawing Sheets

SYSTEM AND METHOD FOR USING A SINGLE POINT INDICATOR AS A CPU UTILIZATION INDICATOR

BACKGROUND

The present invention relates generally to computer central processing units (CPUs) and more particularly, to methods and systems for indicating a current utilization level of the CPU.

CPU utilization is a current calculation of how busy a CPU is at the current time. The CPU utilization is typically accessible through various graphical displays that express the CPU utilization as a graphical expression. FIG. 1 shows a typical graphical expression 10 of the CPU utilization. The graphical expression 10 of the CPU utilization is represented in a scale. The scale is typically a percentage in the vertical axis and a current window of time (e.g., 30 seconds) in the horizontal axis. The graphical expression 10 is typically displayed in a display screen.

The CPU utilization is also often expressed as a numerical value, typically expressed as a percentage (e.g., 53%). The numerical value 20 is also typically displayed in a display screen. The numerical value 20 can be combined with the graphical expression 10 as shown in FIG. 1.

Unfortunately each of the graphical expression 10 and the numerical value 20 require a relatively complex display screen and supporting hardware. This relatively complex display screen and supporting hardware is more complex than necessary and must be large enough to be accurately and easily read by a user. These factors increase the cost of the display screen and reduce the user accessibility of the CPU utilization.

Further, each of the graphical expression 10 and the numerical value 20 require a user to read multiple portions of information from the CPU utilization indication. By way of example the graphical expression 10 requires the user to orient the currently displayed graphical value relative to the axes (percentage and time) to determine the current CPU utilization. When the CPU utilization is expressed as a numerical value 20, the user must be able to clearly read each digit of the expressed numerical value 20 to accurately determine the current CPU utilization.

In view of the foregoing, there is a need for a simpler, more accessible and more intuitive indicator for current CPU utilization.

SUMMARY

Broadly speaking, the present invention fills these needs by providing a system and a method for a single point indicator capable of emitting a variety of wavelengths of light. It should be appreciated that the present invention can be implemented in numerous ways, including as a process, an apparatus, a system, computer readable media, or a device. Several inventive embodiments of the present invention are described below.

One embodiment provides a computer including a microprocessor, a memory system, a bus system, and a single point indicator. The memory system includes an operating system stored therein. The bus system couples the memory system to the microprocessor. The single point indicator is coupled to the microprocessor and is capable of emitting a single point of light of substantially any wavelength in a visible spectrum. The computer also includes logic that determines a level of a selected operational parameter of the computer and logic that generates a corresponding wavelength of light emitted from the single point indicator. The corresponding wavelength of light corresponds to the level of the selected operational parameter.

The single point indicator can include a red-green-blue light emitting diode driving circuit coupled to the microprocessor. The RGB LED driving circuit can include a RGB LED. The single point indicator can be mounted in a location visible to a user.

The operational parameters of the computer can includes a temperature of at least one portion of the computer, a utilization of the microprocessor, a performance of an application operating on the computer or a throughput of an input/output portion. The level of the selected operational parameter of the computer can de determined from an output from the operating system or the microprocessor or a combination thereof.

The microprocessor can include multiple microprocessors and the single point indicator can include multiple corresponding single point indicators. The microprocessor can include multiple CPU cores and the single point indicator can include multiple corresponding single point indicators.

The logic that generates the corresponding wavelength of light emitted from the single point indicator can include logic that generates a corresponding intensity of the corresponding wavelength of light emitted from the single point indicator. The logic that determines the level of the selected operational parameter can includes logic that determines an average level of the selected operational parameter during a selected time interval. The logic that generates the corresponding wavelength of light emitted from the single point indicator generates the corresponding wavelength of light emitted from the single point indicator for the selected time interval.

The logic that generates the corresponding wavelength of light emitted from the single point indicator can include logic for dividing a spectrum of wavelengths of light capable of being output from the single point indicator into a selected number of spectrum segments, logic for assigning a selected one of the wavelengths for each one of the spectrum segments and logic for dividing a range of levels of the selected operational parameter into the selected number of range segments.

Another embodiment provides a computer including a microprocessor, a memory system, a bus system and a red-green-blue light emitting diode driving circuit. The memory system includes an operating system stored therein and the bus system couples the memory system to the microprocessor. The RGB LED driving circuit is coupled to the microprocessor and the RGB LED driving circuit includes a RGB LED. The computer also includes logic that determines a level of a utilization of the microprocessor and logic that generates a corresponding wavelength of light emitted from the RGB LED. The corresponding wavelength of light corresponds to the level of the utilization of the microprocessor. The level of the utilization of the microprocessor is determined from an output from the operating system.

Yet another embodiment provides a method for indicating a level of a selected operational parameter of a computer including determining a level of a selected operational parameter of the computer and generating a corresponding wavelength of light emitted from a red-green-blue light emitting diode. The corresponding wavelength of light corresponds to the level of the selected operational parameter.

The computer can include a microprocessor, a memory system and a bus system. The memory system includes an operating system stored therein. The bus system couples the memory system to the microprocessor and a RGB LED driving circuit is coupled to the microprocessor. The RGB LED driving circuit includes the RGB LED.

Generating the corresponding wavelength of light emitted from the RGB LED can include generating a corresponding intensity of the corresponding wavelength of light emitted from the RGB LED. Generating the corresponding wavelength of light emitted from the RGB LED, can include dividing a spectrum of wavelengths of light capable of being emitted from the RGB LED into a selected number of spectrum segments, assigning a selected one of the wavelengths for each one of the selected number of spectrum segments. A range of levels of the selected operational parameter of the computer is divided into the selected number of range segments.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1:
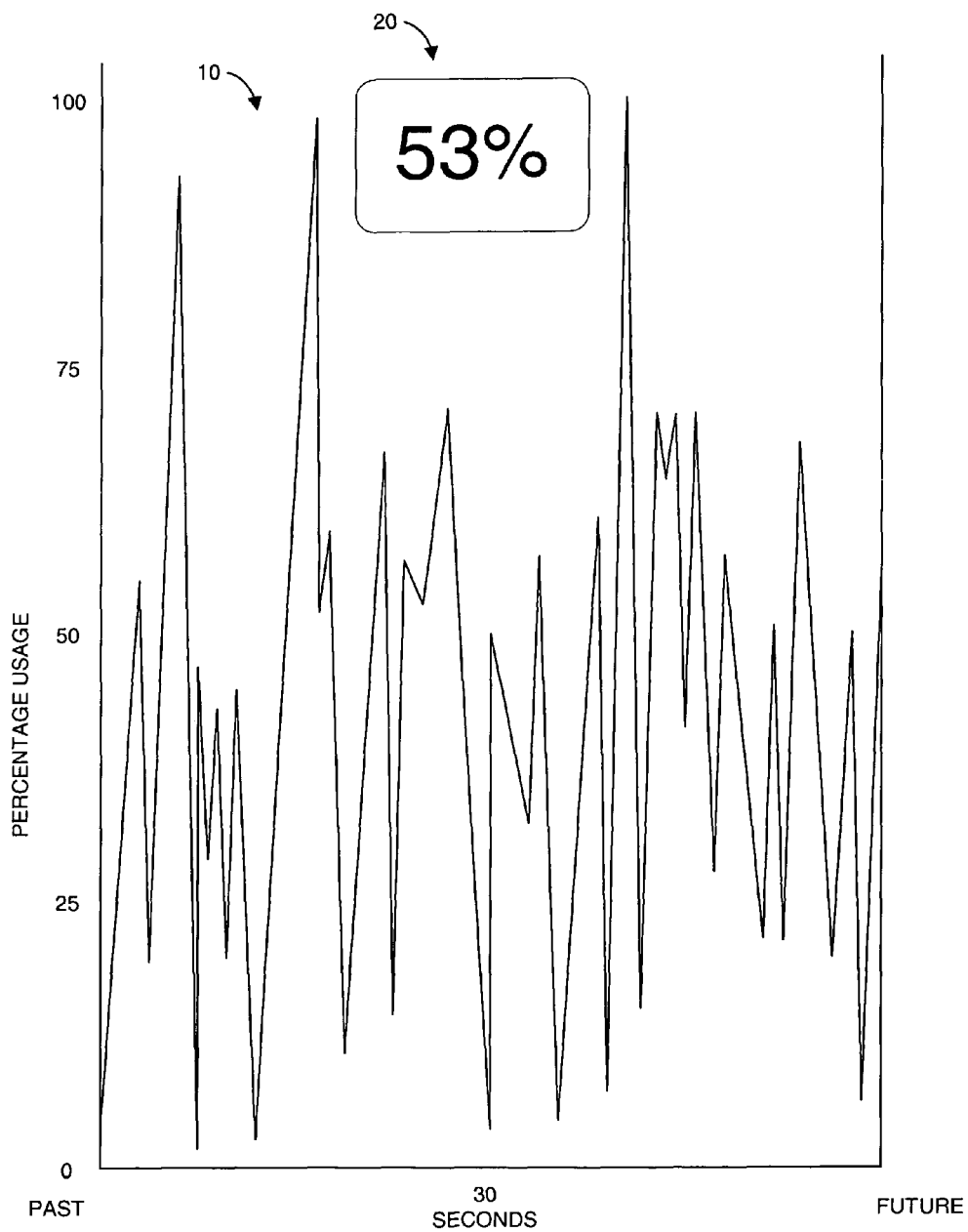
FIG. 1 shows a typical graphical expression of the CPU utilization.

Several exemplary embodiments for systems and methods for using a single point indicator for a CPU utilization indicator will now be described. It will be apparent to those skilled in the art that the present invention may be practiced without some or all of the specific details set forth herein.

One aspect of the invention provides a single point visual indicator that can provide a single point indication of an operational parameter of a computer. By way of example the single point indicator provides a visual indication of a current processor utilization level. The single point indicator does not require detailed reading and comparison to scales as required by the prior art graphical displays or numerical values. The single point indicator can be any type of device capable of displaying a single point of light of substantially any wavelength in a visible spectrum. By way of example, a red-green-blue (RGB) light emitting diode (LED) or a variable wavelength laser or a filtered light source are some examples of single point indicators that are capable of outputting a single point of light of substantially any wavelength in a visible spectrum.

RGB LEDs are composed of red, green and blue elements and can emit a small single point of light (e.g., about 3.0 mm in diameter, although smaller or larger RGB LEDs could also be used) in substantially any color in the visible light spectrum. Similarly, a filtered light source or a variable wavelength laser can emit a single point of light in substantially any color in the visible spectrum.

A single point indicator can be mounted on a computer enclosure and thereby allow a user to simply glance at the computer enclosure and quickly and easily ascertain the current state of the selected operational parameter (e.g., CPU utilization). The single point indicator allows the user to readily ascertain the current state of the selected operational parameter even from across the room. Such a visual indication can also be provided in a small space, and still offer clear visual cues. For example, looking at the front of one or more rack mounted or desktop computers.

A single point of colored light is an ideal mechanism for expressing values in terms of color. Using a rainbow as an example, where indigo (one end of the visible spectrum) can indicate a smaller value or a lower rate and red can indicate a higher values or a higher rate. The intermediate colors of blue, green, yellow and orange (and varying shades therein) are transitional colors and can indicate the corresponding graduations in intermediate values or rates.

RGB LEDs can therefore be used to indicate a CPU utilization based on some user-configurable scale. By way of example, indigo (i.e., darkish blue-purple) could correspond to one end (e.g., fast or slow) of the range of values or rates and the opposite end of the spectrum (e.g., red) could indicate the corresponding opposite end (e.g., fast or slow) of the range of values or rates. By way of example, indigo can indicate a minimum rate or value and red could indicate a maximum rate or value. Users can easily grasp the concept and immediately recognize and correspond the color of the indicator to the corresponding value or rate.

Figure 2A:
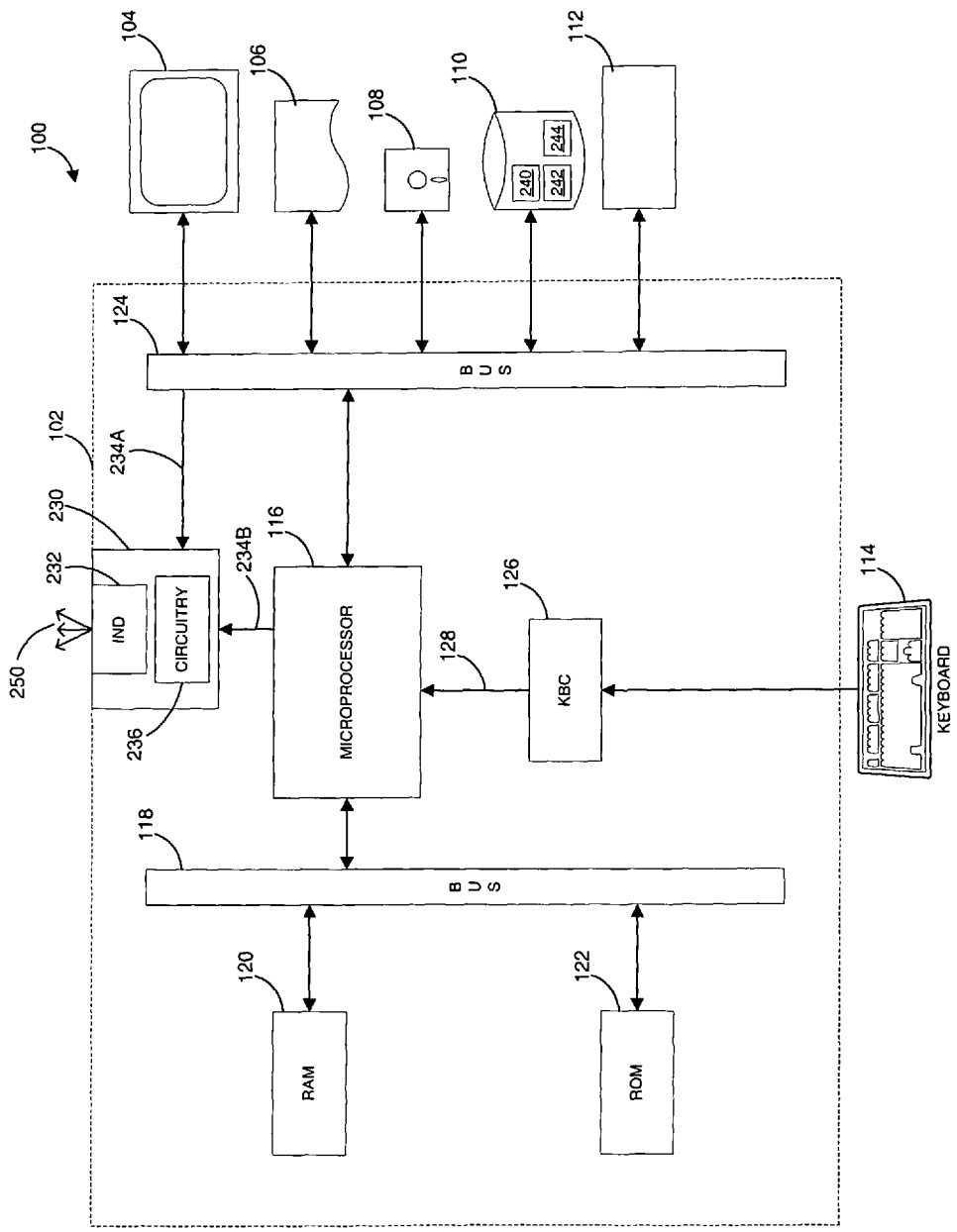
FIG. 2A is a block diagram of an exemplary computer system, in accordance with an embodiment of the invention.

FIG. 2A is a block diagram of an exemplary computer system 100, in accordance with an embodiment of the invention. The computer system 100 includes a computer 102, a display screen (or monitor) 104, a printer 106, a floppy, optical (CD-R, CD-R/W, DVD-R, DVD-RW) or other type of removable media (e.g., flash memory, etc.) drive 108, a hard disk drive 110, a network interface 112, and a keyboard 114. The computer 102 includes a microprocessor 116, a memory bus 118, a random access memory (RAM) 120, a read only memory (ROM) 122, a peripheral bus 124, and a keyboard controller (KBC) 126. The computer 102 can be a personal computer (such as an IBM compatible personal computer, a Macintosh computer or Macintosh compatible computer), a workstation computer (such as a Sun Microsystems or Hewlett-Packard workstation), a server or some other type of computer.

The microprocessor 116 can be a general-purpose digital processor or a special purpose microprocessor, which controls the operation of the computer system 100. The microprocessor 116 can be a single-chip processor. The microprocessor 116 can be implemented with multiple, separate integrated circuits and/or multiple processing cores. By way of example, the microprocessor 116 can include two or more processing cores in each of two or more integrated circuits. Using instructions retrieved from memory, the microprocessor 116 controls the reception and manipulation of input data and the output and display of data on output devices.

The memory bus 118 is used by the microprocessor 116 to access the RAM 120 and the ROM 122. The RAM 120 is used by the microprocessor 116 as a general storage area and as scratch-pad memory, and can also be used to store input data and processed data. The ROM 122 can be used to store instructions or program code followed by the microprocessor 116 as well as other data.

The peripheral bus 124 is used to access the input, output, and storage devices used by the computer 102. In the described embodiment, these devices include the display screen 104, the printer device 106, the floppy disk drive 108, the hard disk drive 110, and the network interface 112. The keyboard controller 126 is used to receive input from keyboard 114 and send decoded symbols for each pressed key to microprocessor 116 over bus 128.

The display screen 104 is an output device that displays images of data provided by the microprocessor 116 via the peripheral bus 124 or provided by other components in the computer system 100. The printer device 106, when operating as a printer, provides an image on a sheet of paper or a similar surface. Other output devices such as a plotter, typesetter, etc. can be used in place of, or in addition to, the printer device 106.

The floppy, optical (CD-R, CD-R/W, DVD-R, DVD-RW) or other type of removable media (e.g., flash memory, etc.) drive 108 and the hard disk drive 110 can be used to store various types of data. Drive 108 facilitates transporting such data to other computer systems, and hard disk drive 110 permits fast access to large amounts of stored data. It should be understood that each of the drives 108 and 110 can include more than one physical drives or may be partitioned into multiple virtual drives.

The microprocessor 116 together with an operating system 240 and various applications 242 operate to execute computer code and produce and use data 244. The computer code and data may reside on the RAM 120, the ROM 122, or the hard disk drive 110. The computer code 240, 242 and data 244 could also reside on a removable program medium and loaded or installed onto the computer system 100 when needed. Removable program media include, for example, CD-ROM, PC-CARD, floppy disk and magnetic tape.

The network interface 112 is used to send and receive data over a network connected to other computer systems. An interface card or similar device and appropriate software implemented by the microprocessor 116 can be used to connect the computer system 100 to an existing network and transfer data according to standard protocols.

The keyboard 114 is used by a user to input commands and other instructions to the computer system 100. Other types of user input devices can also be used in conjunction with the present invention. For example, pointing devices such as a computer mouse, a track ball, a stylus, or a tablet can be used to manipulate a pointer on a screen of a general-purpose computer.

The computer 102 also includes a single point indicator driving circuit 230. The single point indicator driving circuit 230 is coupled to one or both of the microprocessor 116 and/or one of the internal buses 118, 124 via logical connections 234A and/or 234B. The single point indicator driving circuit 230 includes a single point indicator 232 and circuitry 236 to drive the single point indicator 232.

The single point indicator circuitry 236 can include sampling circuitry, logic circuitry and software. The single point indicator circuitry 236 also includes driving circuitry to cause the single point indicator 232 to emit light 250 in the desired color and/or intensity in response to a received input. The precise correlations between the color and/or intensity of the light 250 emitted from the single point indicator 232 and an input signal to the circuitry 236 can be determined by logic internal to the circuitry 236 and/or by an application 242 and/or the operating system 240 that are external from the circuitry 236.

The single point indicator 232 can be an RGB LED or any other device capable of emitting a single-point of multiple colored light including for example a filtered light source or a variable wavelength laser or any other suitable device.

Figure 2B:
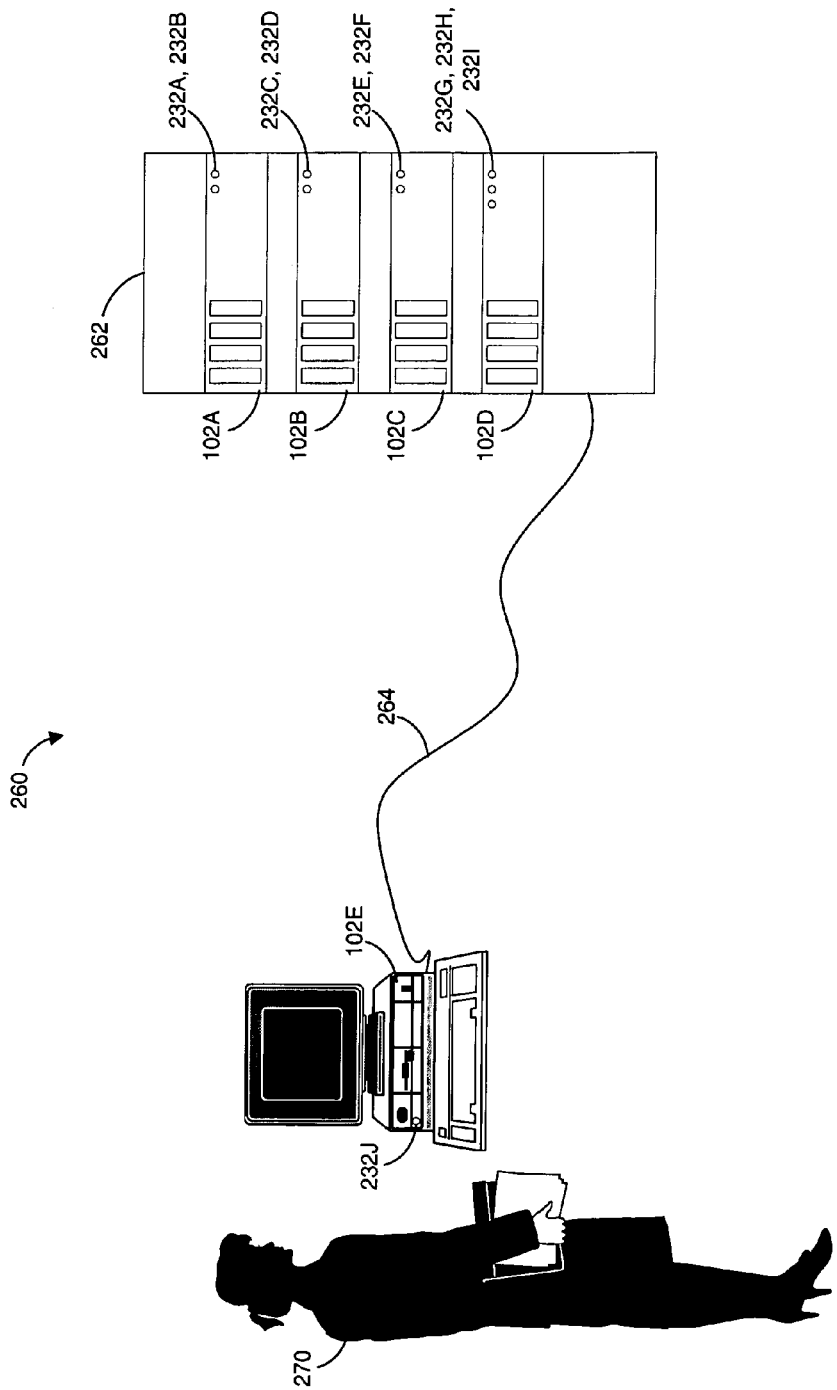
FIG. 2B is a block diagram of a computer network, in accordance with an embodiment of the present invention.

FIG. 2B is a block diagram of a computer network 260, in accordance with an embodiment of the present invention. The computer network 260 includes a rack 262 supporting computers 102A-D. The computers 102A-D are coupled to another computer 102E via the network cable 264. Each of the computers 102A-E include respective single point indicators 232A-J. The single point indicators 232A-J are clearly visible to a user 270 as they are located on the external portion of the enclosure of each of the computers 102A-E. The single point indicators 232A-J therefore allow a user to readily and easily ascertain the current status of each of the computers 102A-E with merely a glance at the colors and or intensities of the single point indicators 232A-J.

Figure 3:
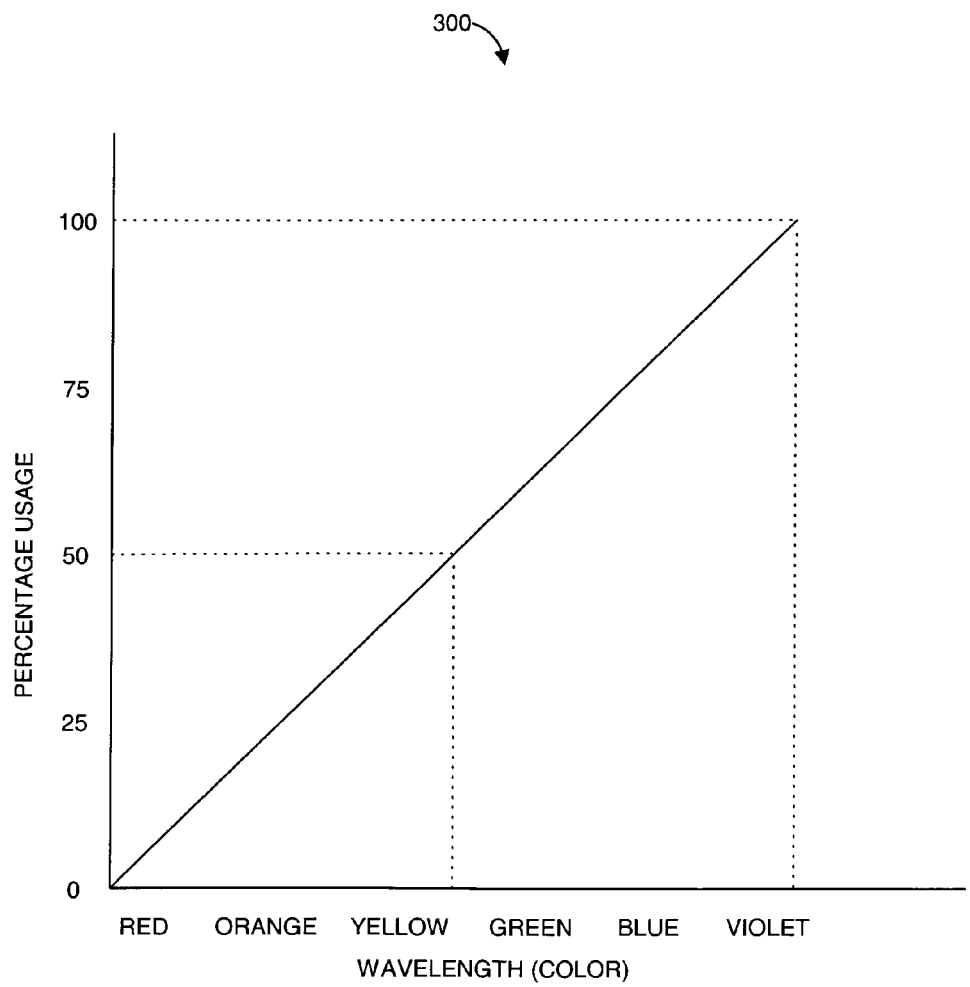
FIG. 3 is a graphical representation of a correlation between a range of utilization and a spectrum of colors of light, in accordance with an embodiment of the present invention.

FIG. 3 is a graphical representation 300 of a correlation between a range of utilization and a spectrum of colors of light, in accordance with an embodiment of the present invention. The color of the light 250 emitted from the single point indicator 232 is correlated to a percentage of utilization or usage. By way of example at 50% usage, the single point indicator 232 emits a yellow-green light 250. At 100% usage, the single point indicator 232 emits a violet light 250. As the percentage of usage increases from zero to 100% the color of the light 250 emitted from the single point indicator 232 correspondingly changes from red to orange to yellow to green to blue and then to violet.

It should be understood that the precise order of the colors of the light 250 emitted from the single point indicator 232 is not limited to the naturally occurring order of colors. The natural order of visual light has red as the longest wavelength visible light occurring first and violet as the shortest wavelength visible light, occurring last. The intermediate transition colors of orange, yellow, green and blue occur between red and violet according to their respective wavelengths. By way of example, for various reasons a user may wish the colors of the light 250 to be emitted in a different order (e.g., yellow to violet to blue to green to orange and then to red).

It should be understood that fewer colors could also be used. By way of example, a user may wish to only see a progression of colors beginning with green to indicate a low end of the indicated range, then to blue, then to yellow, then to orange and then to red to indicate the top of the indicated range. As described above, the single point circuitry 236 and/or the application 242 and/or the operating system 240 can determine the precise correlations between the color of the light 250 emitted from the single point indicator 232 and the level of the operational parameter being indicated.

Figure 4:
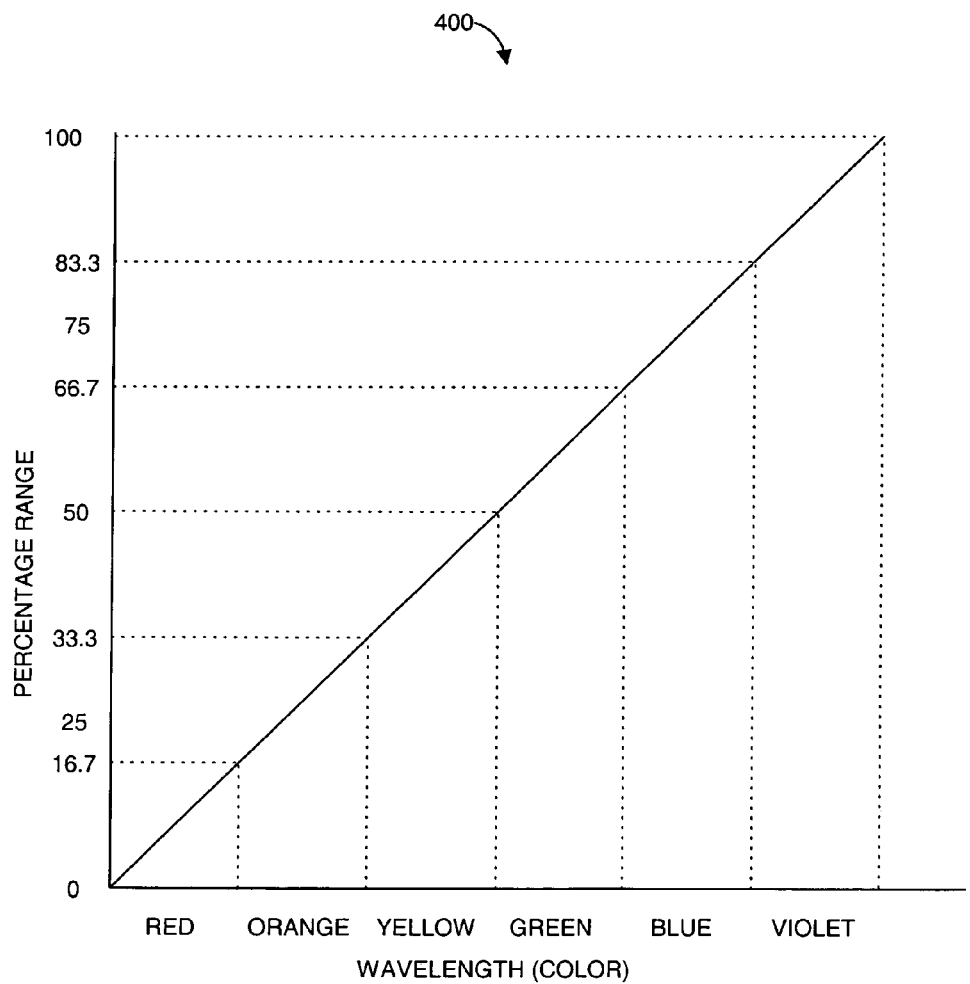
FIG. 4 is a graphical representation of a correlation between a range of utilization and a spectrum of colors of light, in accordance with an embodiment of the present invention.

FIG. 4 is a graphical representation 400 of a correlation between a range of utilization and a spectrum of colors of light, in accordance with an embodiment of the present invention. As shown in FIG. 4, the detected range of the operational parameter is divided into a corresponding selected number of colors of light 250 to be emitted from the single point indicator 232. By way of example, six distinct colors (i.e., spectrum segments) are selected, although it should be understood that more or fewer distinct colors could be selected. The detected range is then divided into corresponding six segments: 0-16.7%, 16.7-33.3%, 33.3-50%, 50-66.7%, 66.7-83.3% and 83.3-100%. As a result the light 250 will be red to indicate levels of the operational parameter between 0% and 16.7%. The light 250 will change to orange to indicate levels of the operational parameter between 16.7% and 33.3%. The light 250 will change to yellow to indicate levels of the operational parameter between 33.3% and 50%. The light 250 will change to green to indicate levels of the operational parameter between 50% and 66.7%. The light 250 will change to blue to indicate levels of the operational parameter between 66.7% and 83.3%. The light 250 will change to violet to indicate levels of the operational parameter between 83.3% and 100%.

The six segments can be equally spaced, as shown or unequally spaced or a combination thereof. By way of example, a user may desire that the single point indicator 232 emit a green light 250 for the rage of 0-50% of the range and then yellow for 50-60% of the range and then orange from 60-80% of the range and then red from 80-100% of the range.

While the CPU utilization is being discussed herein as an operational parameter of the computer that can be indicated by the single point indicator 232, it should also be understood that any other operational parameters of the computer can similarly be indicated by the single point indicator 232. By way of example, a voltage, a current, a temperature of the computer or some portion thereof, a performance of an application operating on the computer or even a data throughput rate of an input/output portion of the computer. It should be understood that this list of operational parameters is not complete nor exhaustive and any detectable operational parameter of the computer could be indicated by the single point indicator 232.

Multiple single point indicators can also be used to indicate different operational parameters of the computer. By way of example and referring again to FIG. 2B, each of computers 102A-102D have multiple single point indicators 232A-H, respectively. Computer 102A can be a multiple microprocessor computer each processor has a corresponding single point indicator 232A, 232B. Computer 102D however is a file server and has a first single point indicator 232G that indicates the utilization of the microprocessor in computer 102D. A second single point indicator 232H indicate a temperature in the computer 102D and a third single point indicator 232I indicates a throughput rate of an I/O portion of the computer 102D.

An intensity of the light 250 emitted from the single point indicator 232 can be varied to indicate range of a selected operational parameter of the computer. By way of example, the intensity (i.e., brightness) of the light 250 emitted from the single point indicator 232 can be increased as the percentage of the detected operational parameter increases. The intensity can increase with the change in color of the light 250 emitted from the single point indicator 232 or the independent from the change in color of the light 250. By way of example and referring to FIG. 3, as the percentage of usage increases, the intensity can correspondingly gradually increase as the color of the light 250 changes progress from red to orange to yellow to green to blue and to violet. The intensity of the light 250 would be at a maximum level when the percentage of usage reached a maxim level (i.e., 100%). Alternatively, the intensity of the light 250 emitted from the single point indicator 232 can be used to indicate a second operational parameter of the computer and therefore the intensity of the light 250 emitted from the single point indicator 232 would vary independent from the color of the light 250 emitted from the single point indicator 232.

Figure 5:
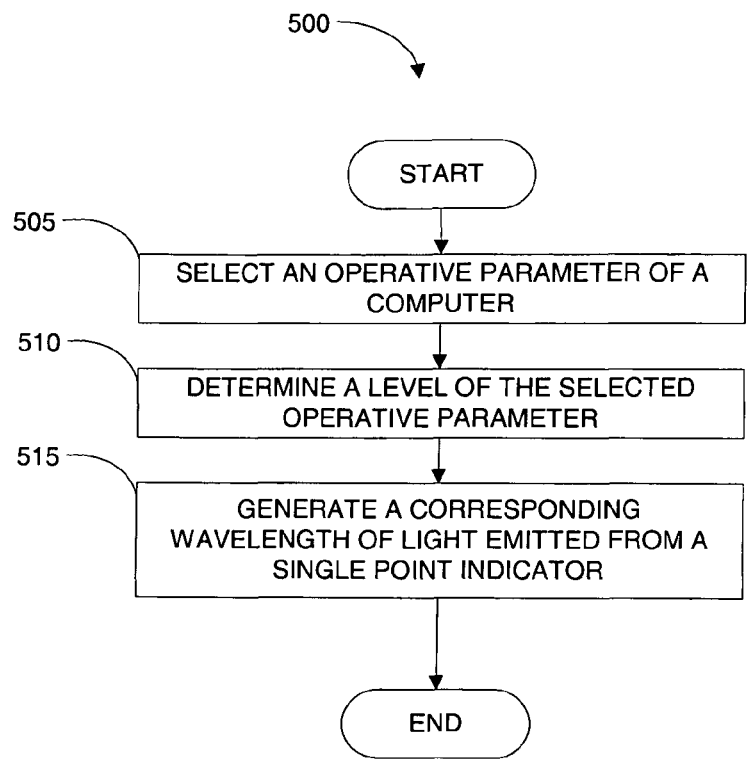
FIG. 5 is a flowchart diagram that illustrates the method operations performed in indicating a level of a selected operational parameter of a computer, in accordance with one embodiment of the present invention.

FIG. 5 is a flowchart diagram that illustrates the method operations 500 performed in indicating a level of a selected operational parameter of a computer, in accordance with one embodiment of the present invention. In an operation 505 one of the operational parameters of the computer is selected. In an operation 510, the current level of the selected operational parameter is determined. The level of the selected operational parameter can be determined from an output from the operating system or the microprocessor or a combination thereof.

Determining the level of the selected operational parameter can also include determining an average level of the selected operational parameter. The average level of the selected operational parameter can be determined by logic during a selected time interval. The corresponding wavelength of light 250 emitted from the RGB LED 232 can be emitted for the selected time interval.

In an operation 515, a corresponding wavelength of light 250 emitted from a single point indicator 232 (e.g., a RGB LED). The corresponding wavelength of light 250 corresponds to the level of the selected operational parameter of the computer. Generating the corresponding wavelength of light 250 emitted from the RGB LED 232 can include generating a corresponding intensity of the corresponding wavelength of light 250 emitted from the RGB LED.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms; such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:
1. A computer comprising:
   a microprocessor;
   a memory system including an operating system stored therein;

a bus system coupling the memory system to the microprocessor;
a single point indicator coupled to the microprocessor, wherein the single point indicator is mounted in a location visible to a user, the single point indicator being capable of emitting a single point of light of substantially any wavelength in a visible spectrum;
first logic that determines a level of a selected one of a plurality of operational parameters of the computer, wherein the selected one of the plurality of operational parameters varies continuously between a first level and a second level, wherein the first logic is operable to distinguish between at least the first level and the second level, wherein the first and second levels are distinct from each other, and wherein the first and second levels are non-zero; and
second logic that generates a corresponding wavelength of light emitted from the single point indicator, wherein the corresponding wavelength of light corresponds to the level of the selected one of the plurality of operational parameters of the computer, wherein the second logic is operable to generate a first wavelength corresponding to the first level and a second wavelength corresponding to the second level, wherein the first and second wavelengths are distinct from each other, and wherein the first and second wavelengths are within the visible spectrum,
wherein the first logic-includes logic that determines an average level of the selected one of a plurality of operational parameters of the computer during a selected time interval and
wherein the second logic generates the corresponding wavelength of light emitted from the single point indicator for the selected time interval.

2. The computer of claim 1, wherein the single point indicator includes a red-green-blue light emitting diode (RGB LED) driving circuit coupled to the microprocessor, the RGB LED driving circuit including a RGB LED.

3. The computer of claim 1, wherein the plurality of operational parameters of the computer includes at least one of a temperature of at least one portion of the computer, a utilization of the microprocessor, a performance of an application operating on the computer or a throughput of an input/output portion.

4. The computer of claim 1, wherein the level of the selected one of the plurality of operational parameters of the computer is determined from an output from the operating system.

5. The computer of claim 1, wherein the level of the selected one of the plurality of operational parameters of the computer is determined from an output from the microprocessor.

6. The computer of claim 1, wherein the microprocessor includes a plurality of microprocessors and wherein the single point indicator includes a corresponding plurality of single point indicators.

7. The computer of claim 1, wherein the microprocessor includes a plurality of CPU cores and wherein the single point indicator includes a corresponding plurality of single point indicators.

8. The computer of claim 1, wherein the second logic includes logic that generates a corresponding intensity of the corresponding wavelength of light emitted from the single point indicator.

9. A computer comprising:
a microprocessor;
a memory system including an operating system stored therein;
a bus system coupling the memory system to the microprocessor;
a single point indicator coupled to the microprocessor, wherein the single point indicator is mounted in a location visible to a user, the single point indicator being capable of emitting a single point of light of substantially any wavelength in a visible spectrum;
first logic that determines a level of a selected one of a plurality of operational parameters of the computer, wherein the selected one of the plurality of operational parameters varies continuously between a first level and a second level, wherein the first logic is operable to distinguish between at least the first level and the second level, wherein the first and second levels are distinct from each other, and wherein the first and second levels are non-zero; and
second logic that generates a corresponding wavelength of light emitted from the single point indicator, wherein the corresponding wavelength of light corresponds to the level of the selected one of the plurality of operational parameters of the computer, wherein the second logic is operable to generate a first wavelength corresponding to the first level and a second wavelength corresponding to the second level, wherein the first and second wavelengths are distinct from each other, and wherein the first and second wavelengths are within the visible spectrum,
wherein the second logic includes:
logic for dividing a spectrum of a plurality of wavelengths of light capable of being emitted from the single point indicator into a selected number of unique spectrum segments, wherein the selected number is at least three;
logic for assigning a selected one of the plurality of wavelengths to each one of the spectrum segments;
logic for dividing a range of a plurality of levels of the selected one of the plurality of operational parameters of the computer into the selected number of unique range segments; and
logic for associating each of the selected number of range segments to a unique one of the selected number of spectrum segments.

10. A computer comprising:
a microprocessor;
a memory system including an operating system stored therein;
a bus system coupling the memory system to the microprocessor;
a red-green-blue light emitting diode (RGB LED) driving circuit coupled to the microprocessor, the RGB LED driving circuit including a RGB LED;
first logic that determines a utilization percentage of the microprocessor, wherein the first logic is operable to distinguish between at least a first utilization percentage and a second utilization percentage, wherein the first and second utilization percentages are distinct from each other, and wherein the first and second utilization percentages are non-zero; and
second logic that generates a corresponding wavelength of light output from the RGB LED, wherein the corresponding wavelength of light corresponds to the utilization percentage of the microprocessor, wherein the utilization percentage of the microprocessor is determined from an output from the operating system, wherein the second logic is operable to generate a first wavelength corresponding to the first utilization percentage and a second wavelength corresponding to the second utilization percentage, wherein the first and second wavelengths are distinct from each other, and wherein the first and second wavelengths are within a visible spectrum.

11. A method for indicating a level of a selected one of a plurality of operational parameters of a computer comprising:
selecting a first one of a plurality of operational parameters of the computer;
determining a non-zero first level of the first selected operational parameter;
generating a first wavelength of light emitted from a red-green-blue light emitting diode (RGB LED) corresponding to the first level;
determining a non-zero second level of the first selected operational parameter;
generating a second wavelength of light emitted from the RGB LED corresponding to the second level, wherein the first level is distinct from the second level, wherein the first wavelength is distinct from the second wavelength, and wherein the first and second wavelengths are within a visible spectrum,
wherein determining the first level includes determining an average level of the selected one of a plurality of operational parameters of the computer during a selected time interval and
wherein generating the first wavelength of light emitted from the RGB LED includes generating the first wavelength of light emitted from the RGB LED for the selected time interval.

12. The method of claim 11, wherein the plurality of operational parameters of the computer includes at least one of a temperature of at least one portion of the computer; a utilization of the microprocessor, a performance of an application operating on the computer or a throughput of an input/output portion.

13. A method for indicating a level of a selected one of a plurality of operational parameters of a computer comprising:
selecting a first one of a plurality of operational parameters of the computer;
determining a non-zero first level of the first selected operational parameter;
generating a first wavelength of light emitted from a red-green-blue light emitting diode (RGB LED) corresponding to the first level;
determining a non-zero second level of the first selected operational parameter;
generating a second wavelength of light emitted from the RGB LED corresponding to the second level, wherein the first level is distinct from the second level, wherein the first wavelength is distinct from the second wavelength, and wherein the first and second wavelengths are within a visible spectrum,
further comprising:
dividing a spectrum of a plurality of wavelengths of light capable of being output from the RGB LED into a selected number of unique spectrum segments, wherein the selected number is at least three;
dividing a range of a plurality of levels of the selected one of the plurality of operational parameters of the computer into the selected number of unique range segments;
associating each of the selected number of range segments to a unique one of the selected number of spectrum segments to create the selected number of associated segment pairs; and
assigning a selected one of the plurality of wavelengths to each one of the associated segment pairs.

14. A computer comprising:
a microprocessor;
a memory system including an operating system stored therein;
a bus system coupling the memory system to the microprocessor;
a single point indicator coupled to the microprocessor, wherein the single point indicator is mounted in a location visible to a user, the single point indicator being capable of emitting a single point of light of substantially any wavelength in a visible spectrum;
first logic that determines a level of a selected one of a plurality of operational parameters of the computer, wherein the selected one of the plurality of operational parameters varies continuously between a first level and a second level, wherein the first logic is operable to distinguish between at least the first level and the second level, wherein the first and second levels are distinct from each other, and wherein the first and second levels are non-zero; and
second logic that generates a corresponding wavelength of light emitted from the single point indicator, wherein the corresponding wavelength of light corresponds to the level of the selected one of the plurality of operational parameters of the computer, wherein the second logic is operable to generate a first wavelength corresponding to the first level and a second wavelength corresponding to the second level, wherein the first and second wavelengths are distinct from each other, and wherein the first and second wavelengths are within the visible spectrum,
wherein the selected one of the plurality of operational parameters is a percentage utilization of the microprocessor.

15. A method for indicating a level of a selected one of a plurality of operational parameters of a computer comprising:
selecting a first one of a plurality of operational parameters of the computer;
determining a non-zero first level of the first selected operational parameter;
generating a first wavelength of light emitted from a red-green-blue light emitting diode (RGB LED) corresponding to the first level;
determining a non-zero second level of the first selected operational parameter;
generating a second wavelength of light emitted from the RGB LED corresponding to the second level, wherein the first level is distinct from the second level, wherein the first wavelength is distinct from the second wavelength, and wherein the first and second wavelengths are within a visible spectrum,
wherein the selected one of the plurality of operating parameters of the computer is a percent utilization of a microprocessor of the computer, wherein the method further comprises:
varying the wavelength of light emitted from the RGB LED such that a unique wavelength of light is generated for each unique percent utilization of the microprocessor.

16. A method for indicating a level of a selected one of a plurality of operational parameters of a computer comprising:
selecting a first one of a plurality of operational parameters of the computer;
determining a non-zero first level of the first selected operational parameter;
generating a first wavelength of light emitted from a red-green-blue light emitting diode (RGB LED) corresponding to the first level;
determining a non-zero second level of the first selected operational parameter;

generating a second wavelength of light emitted from the RGB LED corresponding to the second level, wherein the first level is distinct from the second level, wherein the first wavelength is distinct from the second wavelength, and wherein the first and second wavelengths are within a visible spectrum, wherein the selected one of the plurality of operating parameters of the computer is a percent utilization of a microprocessor of the computer, wherein the method further comprises:

dividing a spectrum of a plurality of wavelengths of light capable of being output from the RGB LED into at least six unique spectrum segments;

assigning a single unique wavelength of light from within each unique spectrum segment to represent that unique spectrum segment;

dividing a range of a percent utilization of a microprocessor into at least six unique range segments; and associating each of the at least six unique range segments to a unique one of the at least six unique spectrum segments.

17. The method of claim 16, further comprising sequentially generating each single unique wavelength of light from within each unique spectrum segment in response to the percent utilization of the microprocessor being within the associated unique range segment.

* * * * *

UNITED STATES PATENT AND TRADEMARK OFFICE
CERTIFICATE OF CORRECTION

| | | |
|---|---|---|
| PATENT NO. | : 8,854,228 B1 | |
| APPLICATION NO. | : 11/503091 | |
| DATED | : October 7, 2014 | |
| INVENTOR(S) | : Klissner et al. | |

It is certified that error appears in the above-identified patent and that said Letters Patent is hereby corrected as shown below:

In the Specification

In column 2, line 15, delete "can de" and insert -- can be --, therefor.

In column 6, line 14, delete "and or" and insert -- and/or --, therefor.

In the Claims

In column 9, line 27, in Claim 1, delete "logic-includes" and insert -- logic includes --, therefor.

Signed and Sealed this
Twenty-first Day of April, 2015

Michelle K. Lee
*Director of the United States Patent and Trademark Office*